United States Patent [19]
Schmelzer

[11] Patent Number: 5,971,839
[45] Date of Patent: Oct. 26, 1999

[54] DUST CONTAINMENT VACUUM SYSTEM

[76] Inventor: Hans Schmelzer, 4257 Pepperwood, Long Beach, Calif. 90808

[21] Appl. No.: 09/058,762

[22] Filed: Apr. 11, 1998

[51] Int. Cl.$^6$ ..................................................... B24B 41/00
[52] U.S. Cl. ........................................... 451/456; 451/451
[58] Field of Search ................................... 451/451, 456, 451/453, 89, 88

[56] References Cited

U.S. PATENT DOCUMENTS

| | | | |
|---|---|---|---|
| 2,111,782 | 3/1938 | Hudson | 451/453 |
| 4,333,745 | 6/1982 | Zeanwick | 451/453 |
| 4,610,113 | 9/1986 | Fagerroos | 451/89 |
| 4,697,854 | 10/1987 | Lunsford | 451/453 |

FOREIGN PATENT DOCUMENTS

| | | | |
|---|---|---|---|
| 423479 | 1/1926 | Germany | 451/451 |
| 0021462 | 12/1912 | United Kingdom | 451/451 |

Primary Examiner—Robert A. Rose
Attorney, Agent, or Firm—Marcia Devon, Patent Attorney

[57] ABSTRACT

A fully integrated, transportable cabinet stand is provided, particularly adopted for machining metal parts, with a cabinet box enclosing the motor to be used. A vacuum pump causes air to flow out of the rear of the cabinet box through a filtering system which remove the particulant matter produce by the machining operation. A moveable slide plate formed with adjustable arm holes increases the operator's range of motion.

4 Claims, 3 Drawing Sheets

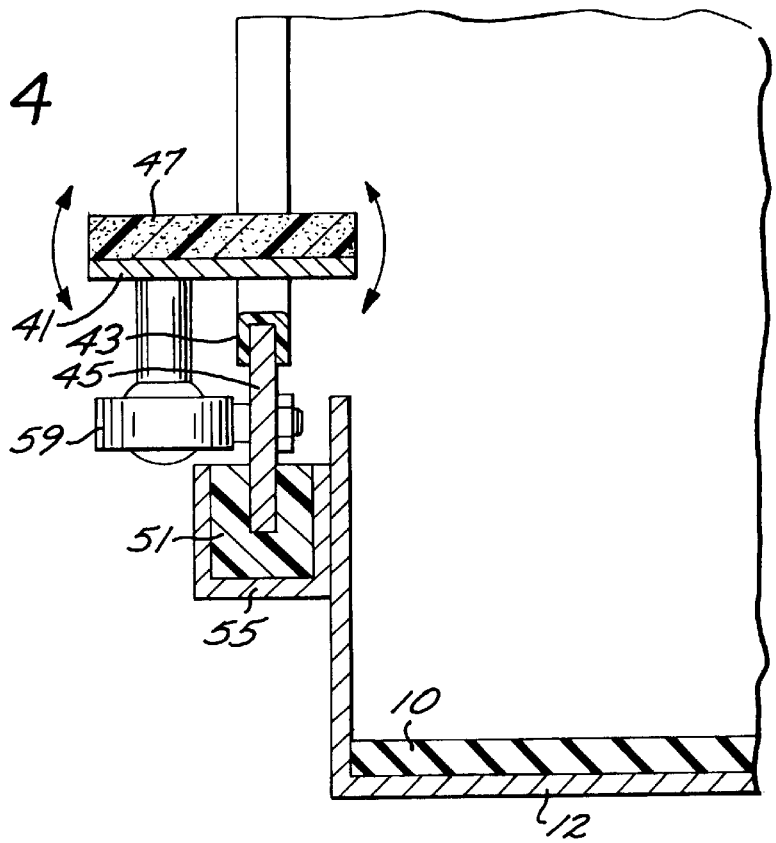
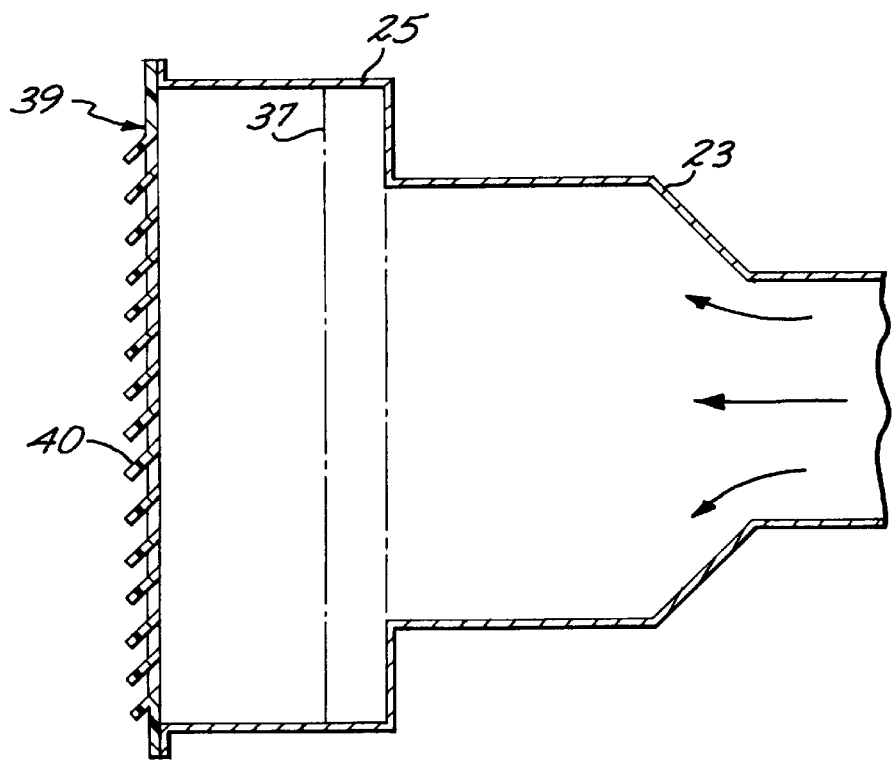

DUST CONTAINMENT VACUUM SYSTEM

BACKGROUND OF THE INVENTION

1. Field of the Invention

The present invention relates to devices for finishing or machining metal, particularly buffers and grinders, which are contained within a cabinet and are operated from outside the cabinet.

2. Description of the Prior Art

A dust containment system is desirable, which will contain the by-products from the operation of devices which machine or finish metal parts, such as in the buffing or grinding process. A dust containment system is needed to protect the worker from inhaling noxious particles, particularly in an industrial environment where workers are constantly exposed. The machines also suffer from exposure to particles or dust, particularly metal, which are the by-products of various material removal operations.

The standard prevention method for humans is to wear dust masks and goggles. The standard prevention method for the machines, and humans who do not have to operate the material removal devices, is for the grinding and buffing operations to be performed in a separate room from the rest of the factory operations. Masks and goggles are not sufficient to protect workers or machinery, even in a separate room, against the small particles or dust which is the by-product of grinding, debarring, and buffing.

Prior Art devices, such as U.S. Pat. No. 4,300,318, and U.S. Pat. No. 5,177,911 are particularly adapted to the abrasive blasting process, not metal finishing, and have different objectives than the present invention. U.S. Pat. No. 5,177,911 discloses a cabinet with arm holes enclosing a blasting gun but the vacuum pump is outside and separate from the cabinet. Both U.S. Pat. Nos. 4,300,318 and 5,177,911 provide gloves which are affixed to the cabinet around access holes for use by the operator performing the blasting process. The gloves are fixed in one position in the cabinet thereby severely limiting the operator's range of motion. When the operation is abrasive blasting rather than machining metal parts, having substantial range of motion is not as necessary. However, for machining metal parts, a cabinet is required which will permit the user to move his arms longitudinally, back-and-forth across the front of the cabinet. There also exists a need for a cabinet where the access holes are designed for the comfort of the worker which increases productivity.

SUMMARY OF THE PRESENT INVENTION

An object of the present invention is to provide a cabinet system to house a metal finishing device, such as a buffing or grinding motor, where the access openings can be readily moved to permit of the machinist to move his arms and hands in different positions across the length of the cabinet. A further object of the invention is to provide a system to filter the air inside the cabinet box and contain the particles which are produced by the devices. Another object of the present invention is to reduce the scrap-rate caused by mishandling parts. Another object of the present invention is to provide a system which is self-contained and transportable. Another object of the present invention is to provide an ergonominal ann access slide for machinists to work without discomfort, while providing flexibility, in order to maximize their efficiency. A final object of the present invention is to control the air flow and provide an adjustable vent.

The invention provides an integrated cabinet stand to enclose a material removal device, such as a buffing or grinding motor, inside a container or cabinet box, which is mounted on the stand. A vacuum pump is provided to draw air through the cabinet box through a filtering system. An adjustable arm access slide has been created to permit the machinist to move his arms when they are inside the access holes back-and-forth across the length of the cabinet box.

BRIEF DESCRIPTION OF THE DRAWINGS

FIG. 4 is an enlarged view of the portion of the invention identified in FIG. 3;

FIG. 5 is a cross-sectional view taken along the line 5—5 in FIG. 1.

DESCRIPTION OF THE PREFERRED EMBODIMENT

Figure 1:
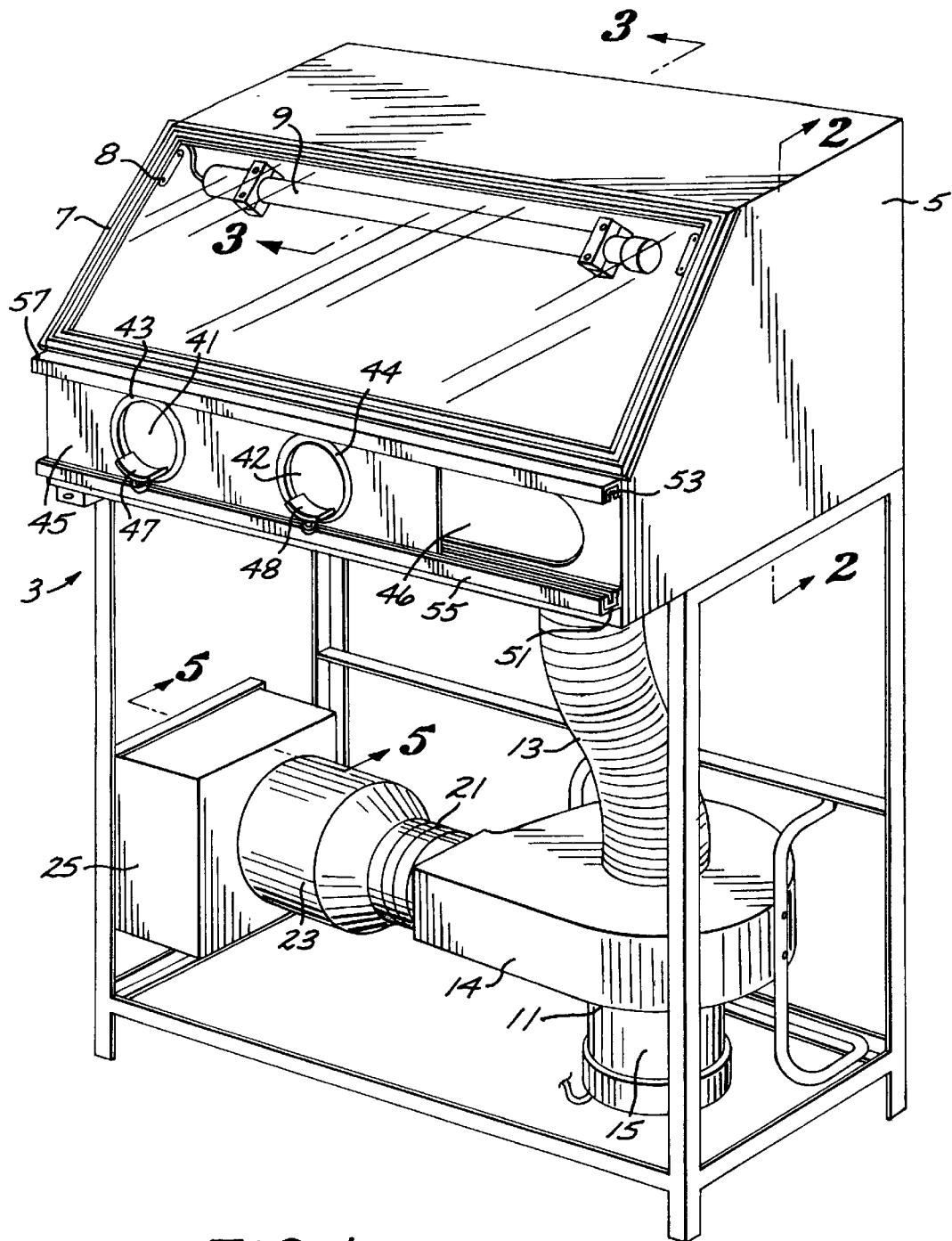
FIG. 1 is a perspective view of the present invention.
Figure 3:
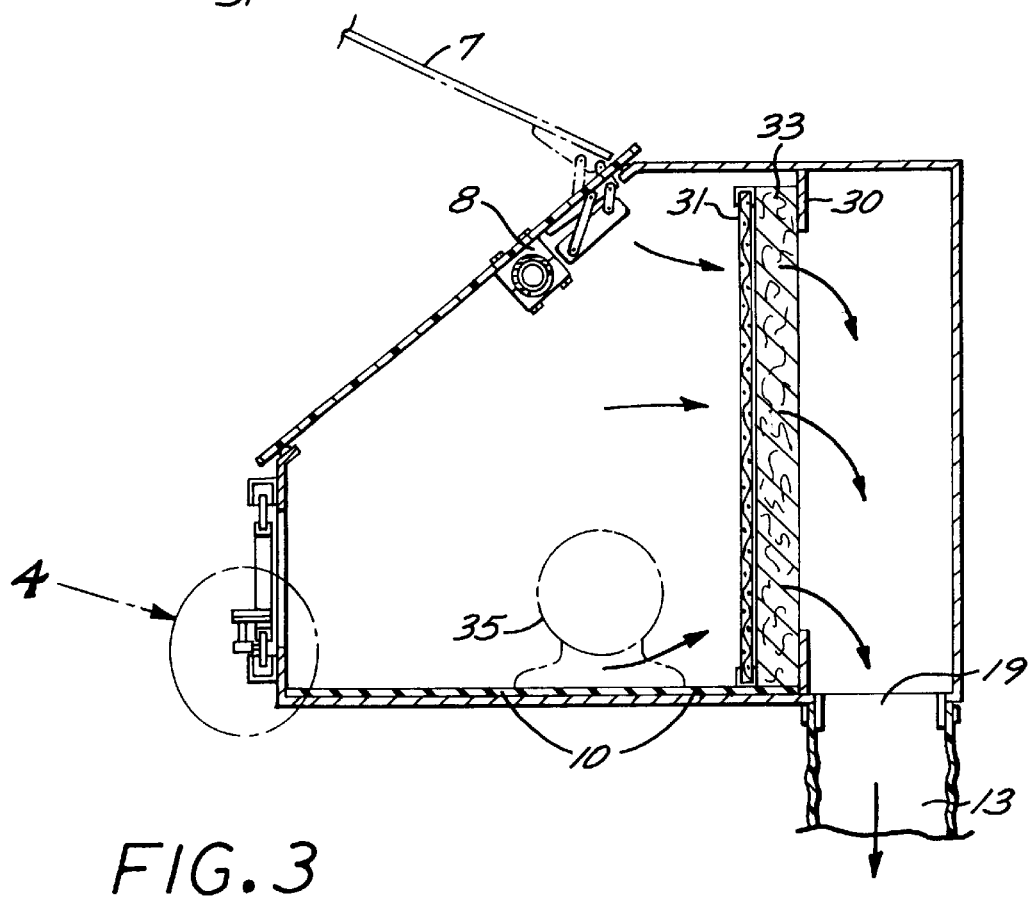
FIG. 3 is a cross-sectional view taken along the line 3—3 in FIG. 1.

Referring to FIG. 1, the front perspective view of the present invention is shown with the cabinet stand 3, which includes a cabinet box 5. The grinding and buffing or other operations take place on motors mounted within the cabinet box. The cabinet box includes a shatterproof, transparent lid 7, made of, e.g. acrylic, which is mounted to the cabinet box with hinge springs 8 on each side of the box. The hinge springs can be fixed in the open position, as seen in FIG. 3, which is desirable for example, when the box is being cleaned. The lid 7 may advantageously include a rubber seal around its edges. A fluorescent light 9 is affixed to the lid of the cabinet box to provide enhanced lighting is shown in FIG. 1. A rubber matting 10 is placed on the floor 12 of the cabinet box (as best seen in FIGS. 4 and 5) which has been found to reduce the number of damaged parts. If, for example a part falls on a unpadded surface, it is likely to be scratched, particularly if the surface of the cabinet floor is metal, which requires scrapping or re-buffing the part.

Figure 2:
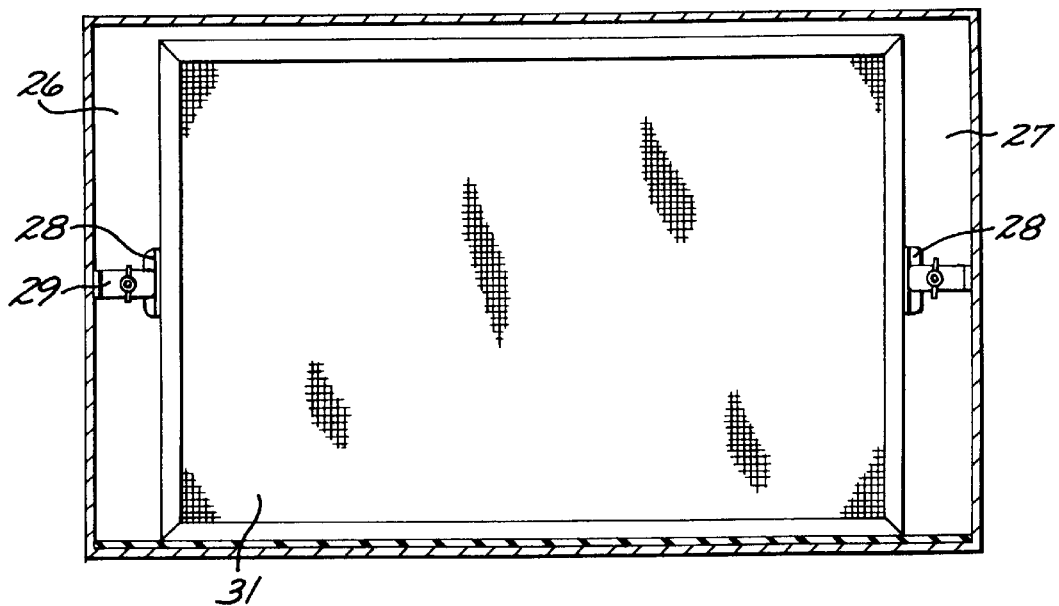
FIG. 2 is a cross-sectional view taken along the lines 2—2 in FIG. 1.

With continued reference to FIG. 1, a vacuum pump 11 forces air from the cabinet box, which contains particles produced by the grinding or buffing operations taking place inside the cabinet box, through the upper hose 13. The vacuum pump 11 includes blower 14 and motor 15. One end of the upper hose 13 is connected to an opening 19 in the floor of the cabinet box as shown in FIG. 2, with an upper intake hood (not shown). The opposing end of the upper hose 13 is connected to the blower portion 14 of the vacuum pump 11.

With continued reference to FIG. 1, the exhaust air is expelled from the vacuum motor 11 through lower hose 21, (upper) air diffuser 23, and lower air diffuser 25. The air diffusers serves as sound dampeners to minimize the industrial noise.

The present invention includes a multiple filtration system which captures the particulant matter or dust produced by the machining operations occurring inside the cabinet box. Referring to FIG. 3, the filtration system includes two filters 31 and 33, mounted in series, back-to-back in the rear portion of the cabinet box. The filter 31 is preferably an expanded aluminum mesh filter which prevents larger pieces of debris from piercing the second cotton-pleated filter 33 and from entering the vacuum motor.

Referring to FIG. 2, the filter 31 is affixed to walls 26 and 27 of the cabinet box using mounting tabs 28, which secure the edge of the filter 31 to the wall of the cabinet box with nuts and bolts 29. The filter 31 is placed over the opening formed by walls 26 and 27 in the rear portion of the cabinet box. The cotton-pleated filter 33 is also mounted to the lip 30 of the cabinet box as shown in FIG. 3.

Air, together with dust or debris produced by the motor 35, is being drawn in the direction of the arrows in FIG. 3, by the vacuum motor, through the aluminum filter 31 and cotton-pleated filter 33 through the upper hose 13. The majority of the dust created by the typical buffing wheel is contained by the time it reaches the cotton pleated filter 33. Additional filters may be utilized to increase the filtering ability of the system. In a preferred embodiment, an additional 3 micron HFPA filter 37 is installed between the upper air diffuser 23 and lower diffuser 25, as shown (in phantom lines) in FIG. 5. After the exhaust air is cleaned through filter 37, it is forced through the diffuser grate 39 and outside the cabinet. With continued reference to FIG. 5 The diffuser grate may advantageously have louvers 40 which permits the operator to direct the exiting air, for example, towards to the floor.

The machinist, who often works with the cabinet on a full time basis, has access to the motor on the interior of the cabinet box 5 through arm holes 41 and 42. (The arm holes are advantageously formed with a protective collars 43 and 44.) The bottom of the arm holes 41 and 42 have padded, flexible arm rests 47 and 48, as best seen in FIG. 1. The arm holes 41 and 42 are formed with in a slide plate 45. The slide plate together with the arm holes glide back and forth in a longitudinal direction past the opening 46 in the front of the cabinet box. The movement of the slide plate and the arm holes permits the machinist's arms to be in the precise position necessary to perform his work within the cabinet. The flexibility and comfort of arm rests 47 and 48, which can be adjusted to maximize the machinist's comfort, have been found to produce increased production rates.

Referring to FIG. 1, the slide plate is 45 is mounted on plastic or nylon U-shaped grooves 51 and 53 within a metal slide plate guides 55 and 57. The slide plate 45, arm holes 41 and 42, arm rests 47 and 48 are interconnected through ball joints 59, as shown in FIG. 4 (only one ball joint shown). The ball joints 59 permit the arm rests to swivel as shown by the arrows in FIG. 4 and permits the operator to adjust the position of the arm rests to positions that suits him.

From the foregoing description, one skilled in the art can easily ascertain the essential characteristics of the invention, including being used of different types of devices within the enclosed cabinet box, without departing from the spirit and scope thereof, and make various changes and modifications to adapt it to various uses.

I claim:

1. A Cabinet Stand for use with material removal devices which create particles as by-products, said cabinet stand comprising:

a frame;

a cabinet box supported by said frame, said box having a front and a rear, for enclosing the material removal device;

pumping means mounted to said frame and connected externally to said cabinet box for eliminating air from said cabinet box;

means for filtering the particles from the air forced out of said cabinet box through said pumping means; and sliding means for moving across the front of said cabinet box, and having arm holes, fitted with arm rests, padding for said arm rests, affixed to rest plates, wherein each said rest plate is connected to a ball joint and said ball joint is connected to said sliding means thereby permitting said arm rests to swivel, said arm holes providing access to the metal finishing device at different locations along the width of said cabinet box, said cabinet box, said pump means, said means for filtering and said slide means contained within the cabinet stand whereby said sliding means is moved longitudinally across the width of said cabinet box into positions selected by the operator.

2. A cabinet stand for use with metal finishing devices which create particles as by-products, said cabinet stand comprising:

a frame;

a cabinet box having a floor, an opening in front of the box for receiving both the arms of the operator and an opening in the rear of the box, said box supported by said frame enclosing the metal finishing device;

pumping means for eliminating air from said cabinet box mounted to said frame;

means for connecting said opening in the rear of the box with said pumping means;

first filtering means for eliminating the larger particles from the air forced out of said cabinet box, said first filtering means mounted in the rear of said cabinet box; and second filtering means for eliminating the smaller particles, said second filtering means interposed between said first filtering means and said opening in the rear of said cabinet, said cabinet box, said pump means, said means for connecting, and said first and filtering means, are all contained within the cabinet stand; and sliding means for moving across the front of the cabinet box and having arm holes with arm rests including padding for said arm rests which are affixed to rest plates, wherein each said rest plate is connected to a ball joint and said ball joint connected to said sliding means thereby permitting said arm rests to swivel, for accessing the metal finishing device at different locations along the width of said cabinet box, wherein said cabinet box, said pump means, said first and second means for filtering and said slide means are contained within the cabinet stand whereby said sliding means is moved longitudinally across the width of said cabinet box into positions selected by the operator.

3. The cabinet stand of claim 1 further including:

means for reducing the noise caused by air being moved by said pumping means through the cabinet stand.

4. The cabinet stand of claim 1 wherein said cabinet box includes a lid which may be opened and closed.

* * * * *